(12) United States Patent
Giampavolo

(10) Patent No.: US 7,591,510 B1
(45) Date of Patent: Sep. 22, 2009

(54) HIGHLY ADJUSTABLE SAFETY BELT FOR CHILD RESTRAINT

(75) Inventor: Paul Giampavolo, Newton, NJ (US)

(73) Assignee: Safe-Strap Company, Inc., Budd Lake, NJ (US)

( * ) Notice: Subject to any disclaimer, the term of this patent is extended or adjusted under 35 U.S.C. 154(b) by 0 days.

(21) Appl. No.: 11/514,485

(22) Filed: Sep. 1, 2006

Related U.S. Application Data

(60) Provisional application No. 60/713,567, filed on Sep. 1, 2005.

(51) Int. Cl.
*A47C 1/08* (2006.01)

(52) U.S. Cl. .................. 297/256.17; 297/482; 297/485; 280/33.993; 280/33.992; 182/3

(58) Field of Classification Search ............ 297/256.17, 297/464, 468, 469, 482, 485, 487; 280/33.993, 280/33.992; 182/3
See application file for complete search history.

(56) References Cited

U.S. PATENT DOCUMENTS

| | | | | |
|---|---|---|---|---|
| 4,637,622 A | * | 1/1987 | Burgard | 280/33.993 |
| 5,263,726 A | * | 11/1993 | Wood | 280/33.992 |
| 5,378,046 A | * | 1/1995 | Gordy et al. | 297/485 |
| 5,624,135 A | * | 4/1997 | Symonds | 280/801.1 |
| 5,669,671 A | * | 9/1997 | Laco | 297/485 |
| 6,409,272 B1 | * | 6/2002 | Martin et al. | 297/484 |
| 6,618,915 B2 | * | 9/2003 | Giampavolo | 24/614 |
| 6,752,466 B2 | * | 6/2004 | Liang | 297/482 |
| 6,834,621 B1 | * | 12/2004 | O'Neill | 119/771 |
| 7,121,628 B2 | * | 10/2006 | Lo | 297/482 |

* cited by examiner

*Primary Examiner*—Laurie K Cranmer
(74) *Attorney, Agent, or Firm*—Weingarten, Schurgin, Gagnebin & Lebovici LLP

(57) ABSTRACT

A seatbelt for a child in a child seat provides a broad range of adjustment by configuring a belt to be threaded through an adjustment cleat with a loose end. The seatbelt adjustment range can be increased by supplying adjustments on two sides of a claspable belt. A sleeve surrounds a portion of the belt to reduce the size of any free loops. The seatbelt retainers can be placed close to one another so that a snug fit for the child in the child seat can be obtained with the seatbelt. The seatbelt configuration provides a secure, simple to manipulate adjustment mechanism that fits a wide range of children for a variety of child seats.

16 Claims, 9 Drawing Sheets

HIGHLY ADJUSTABLE SAFETY BELT FOR CHILD RESTRAINT

RELATED APPLICATIONS

This application claims benefit of U.S. Provisional Application No. 60/713,567, filed Sep. 1, 2005.

STATEMENT REGARDING FEDERALLY SPONSORED RESEARCH OR DEVELOPMENT

N/A

BACKGROUND OF THE INVENTION

1. Field of the Invention

The present invention relates generally to child safety restraints, and relates more particularly to child safety restraints in the form of a seat belt with a wide range of adjustability.

2. Description of Related Art

Seat belts have been used for child restraints in a number of situations, such as strollers, high chairs and shopping carts. A number of different configurations for child restraints that involve seat belts are available, and usually include some form of adjustment to permit the seat belt to be adapted to the size of the child. Most seatbelt type restraints are configured to have an attachment point to secure the seat belt to the seat structure, and a clasping point that is fitted with a cooperative clasping mechanism to secure the seatbelt about the child. Typically, the clasping point is secured or released to restrain or free the child respectively.

Straps typically supplied with a child restraint seat belt are often made to be adjustable to provide a tailored fit for the child in the child seat. Strap adjustments are made to fit the child into the strap harness or seat belt to properly restrain the child and allow for different size children, or the growth of the child over an extended time interval. In the case of publicly available or commercial child seats, such as can be found in high chairs in restaurants or shopping cart seats for a child, the child restraint seat belt operates to restrain children with a wide variety of sizes and shapes. That is, the seat belt restraint is called upon to restrain infants in the range of several months of age, weighing approximately 15 pounds, up to or beyond children of about four years or 48 months of age, with a weight of approximately 35 pounds or more. This wide variety of ages, weights and sizes for the occupants of the child seats creates a number of challenges in properly and safely restraining the child occupant.

In the case of a typical seat belt restraint, the restraint is composed of two straps, each with a fixed end and a clasp end. The fixed ends are attached to the child seat, such as the fold out back portion of a child shopping cart seat, and the clasp ends are coupled together around the child to secure the child in place. An adjustment is provided, typically on one of the straps, to permit the size of the seat belt to be adjusted to that of the child. The adjustment is usually provided on the strap in the form of a threaded cleat to form a loop, the size of which can be changed to provide a corresponding change in the apparent or practical length of the strap. The loop typically includes either a clasp or fixed point, through which the strap can slide to permit the loop adjustment. Two different configurations of this type of seat belt restraint are illustrated in FIGS. 1A and 1B. In FIG. 1A the loop is arranged to encircle a seat fixture such as a wire 19, and another end is attached to a piece of a buckle clasp. In FIG. 1B, one end of the seat belt restraint is attached to wire 19, while the loop of the restraint encircles an attachment portion of the buckle clasp. Alternately, or in addition, one of the seat belt restraint may be attached to a fastener which is attached to wire 19. In either case of FIG. 1A or 1B, the length of the seat belt portion is adjusted by sliding the seat belt through an adjustment cleat 18 to make the loop smaller or larger and consequently make the practical length of the seat belt longer or shorter. In each case, an end of the seat belt is also attached to adjustment cleat 18.

This adjustment configuration permits a range of adjustment from nearly one-half the length of the strap to nearly the full length of the strap. However, it is not feasible to make the practical length of the seat belt portion shorter than approximately half the length of the strap, even when adjustment cleat 18 is positioned as close as possible to the fixed end of the strap without having a loose end. This limitation on how small the length of the strap can be adjusted represents a drawback in child restraint applications where attachment points may be limited. Furthermore, when the seat belt is designed to be adjusted small enough to securely restrain children in the lower end of the size range, the size adjustment configuration does not permit children to be secured in the upper end of the size range. That is, the range of adjustment of the belt configuration does not cover the range of sizes for children that are apt to be placed in the child seat, and in need of restraint.

Another belt adjustment configuration is illustrated in FIG. 1C. The belt configuration in FIG. 1C provides an adjustment for the apparent belt length by adjusting the strap through a retainer that is part of the buckle clasp piece. According to this configuration, a wide range of belt adjustment is available, simply dependent upon the length of the strap. The seat belt can be adjusted so that the buckle clasp piece is positioned very closely to rod 19, or so that the buckle clasp piece can extend approximately half the length of the strap from rod 19. However, the configuration illustrated in FIG. 1C has the drawback that it is difficult to secure the strap in the retainer in a fixed position, meaning that it is fairly easy for a child to loosen the seatbelt. In addition, the configuration shown in FIG. 1C can be dangerous when used on equipment with small children. The bigger loop determined by the longer strap represents a strangulation hazard for small children in the age range of approximately six months to one year.

If an adjustment mechanism is provided that better secures the strap, it tends to be somewhat difficult for a user to adjust due to the additional effort that is undertaken to loosen the securing mechanism to permit the strap to be adjusted to a desired seat belt length. For example, FIG. 1D shows a seat restraint where the strap is threaded through the buckle and through a cleat, leaving a loose end. The adjustment can be more difficult because the cleat is free to move the length of the strap. Also, when the restraint is adjusted to move the cleat closer to the buckle or fastener, it can be more difficult to adjust the restraint. When the cleat is in close proximity to the fastener or the buckle it is difficult to easily access the cleat or the small, tightened portion of the strap near the fastener or buckle to adjust the restraint.

Another criteria for seat belt restraints is related to compliance with standards set forth in consumer safety recommendations. The criteria in some of these standards involves specifications for the safety of children. Referring to FIG. 2, a seat belt restraint with a test dummy 22 is shown. The test dummy is seated and the seat belt restraint is secured around the test dummy. The seat belt in this instance is secured to two wire loops 25, 26 which are located on either side of test dummy 22. In this arrangement, some small gaps or play may exist in the area between test dummy 22 and shopping cart seat 24, as defined by the seat belt. Where these gaps may exist, it is sometimes possible for a child to insert an arm into the gap or to move their body laterally on seat 24, especially if the seatbelt is not adjusted properly. By being able to move their body laterally, the child may be more able to free their legs from the passive crotch restraint provided through the arrangement of wire loop 28. Any of these circumstances may result in a dangerous condition where the child may be able to free themselves from the restraint, or work the seat belt into a position closer to their neck.

Referring FIG. 3, another recommended standard test for proper seat belt restraint fit is illustrated with a test cylinder 32. A size of test cylinder 32 is representative of a child exceeding the recommended age and weight range for the child seat. For example, the cylinder can represent a child in the age range of 3½-4½ years with a weight of approximately 43 pounds. Test cylinder 32 provides test dimensions and specifications for seat belt restraints to meet a more restrictive standard where the seat belt should completely encircle the five-inch cylinder. The more restrictive standard involving the use of test cylinder 32 implies that seat belt designs should be easy for the user to adjust to a desired dimension, and should not be easily manipulated by a child. The desired dimension for the seat belt adjustment should cover the entire range of dimensions for a child that may reasonably be placed in the child seat. With the same seat belt configuration as illustrated in FIG. 2, the gaps between test cylinder 32, the seat belt and the back of the child seat becomes more pronounced. Accordingly, the use of test cylinder 32 is designed to provide a focus for child safety restraints to address the concerns discussed above with respect to FIG. 2.

BRIEF SUMMARY OF THE INVENTION

In accordance with the present invention, there is provided a child restraint safety belt for use in a child seat restraint that provides multiple strap adjustments that are typically easily manipulated by a user, but not by a child. The multiple adjustments are obtained with free-end straps to obtain a wide range of adjustment for the seat belt restraint. A portion of the seat belt straps are surrounded by appropriately dimensioned sleeves that prevent the formation of loops in the seat belt with a dimension that may pose a strangulation hazard.

According to a feature of the present invention, there is provided indicia on the sleeves to communicate information to a user. The indicia may take to the form of warnings, promotional messages and the like.

According to another feature of the present invention, the seat belt may be attached with a single attachment component, to which both ends of the seat belts are attached to provide a simplified installation and use of the seat belt. Alternately, or in addition, an additional attachment point may be provided for the seat belt, for example on an end of the seat belt or along the length of the seat belt portion.

According to another feature of the present invention, the seat belt ends may be attached close to each other, or may be separated by a distance related to the configuration of the child seat to obtain a secure fit for a child placed in the seat. In the case of shopping cart seats, the ends of the seat belt may be attached to appropriate locations on a wire or plastic grid or mesh, for example.

The seat belt may be attached using attachment devices that can be installed without the use of tools, for example. The attachment devices may be sewn into the seat belt or otherwise retained to the seat belt strap. The attachment devices may optionally be formed to be removable.

According to another feature of the present invention, the seat belt may be installed around the fixed portion of the child seat, so that no attachment devices are needed. The use of the child seat to obtain the attachment function for the seat belt is dependent upon the child seat configuration.

According to another embodiment of the present invention, the seat belt strap may be composed of a web material with a durability and resistance to tearing appropriate for use in a given child seat restraint application. According to one embodiment, the seat belt is adapted for use in outdoor activities where it may be exposed to harsh conditions including widely ranging temperatures, precipitation, direct sun and impact, tensile or compressive forces without significantly diminishing the functionality of the seat belt.

According to another embodiment, seat belt components are made of a pliable and durable material sufficient to withstand harsh environments and environmental conditions such as those described above. In accordance with another feature of the present invention, the seat belt includes a buckle that is intuitive and easy to operate for an adult, but difficult or non-obvious to operate for a child. The child resistant buckle contributes to the safety of the seat belt restraint.

According to another feature of the present invention, the seat belt is provided with a crotch strap that is attached to a portion of the child's seat. The crotch strap can contribute to stabilizing the location of the seat belt around the child and improve the fit of the restraint to the individual child. The crotch strap may be fitted with an adjustment mechanism to permit a more custom fit.

BRIEF DESCRIPTION OF THE DRAWINGS

The present invention will be understood in greater detail from the following description read in conjunction with the accompanying drawings in which.

DETAILED DESCRIPTION OF THE PREFERRED EMBODIMENT

This application claims benefit of U.S. Provisional Application No. 60/713,567, filed Sep. 1, 2005, the entire contents of which is hereby incorporated herein by reference.

The present invention provides a safety belt for a child seat restraint that addresses a number of concerns and challenges in child seat safety restraints. The child seat safety restraint preferably includes a number of features that enhance the operability and safety of the restraint. Examples of some of the features that are desirable in a child seat safety restraint include: a good fit to the child occupant, independent of the individual dimensions of the child; simple and intuitive adjustability of the seat belt to provide a custom fit to the child occupant; preventing the child from manipulating or operating the seat belt adjustment or clasp; and providing a durable design that resists deformation or wear in harsh environments. The present invention addresses each of these challenges and provides other safety advantages for both the child and the user.

Figure 1A:
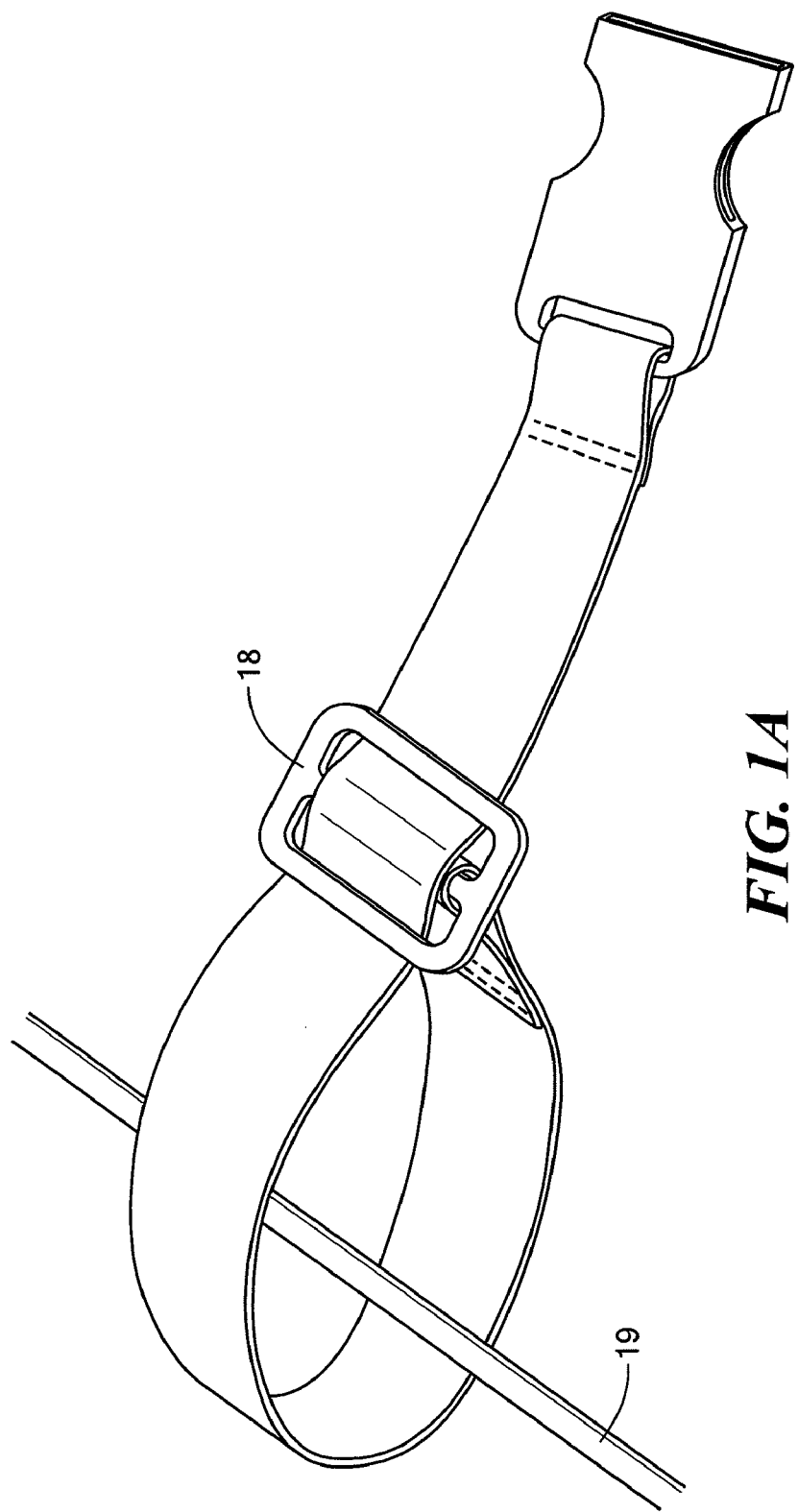
FIGS. 1A-1D are perspective views of conventional seat belt portions with an adjustment mechanism.
Figure 1B:
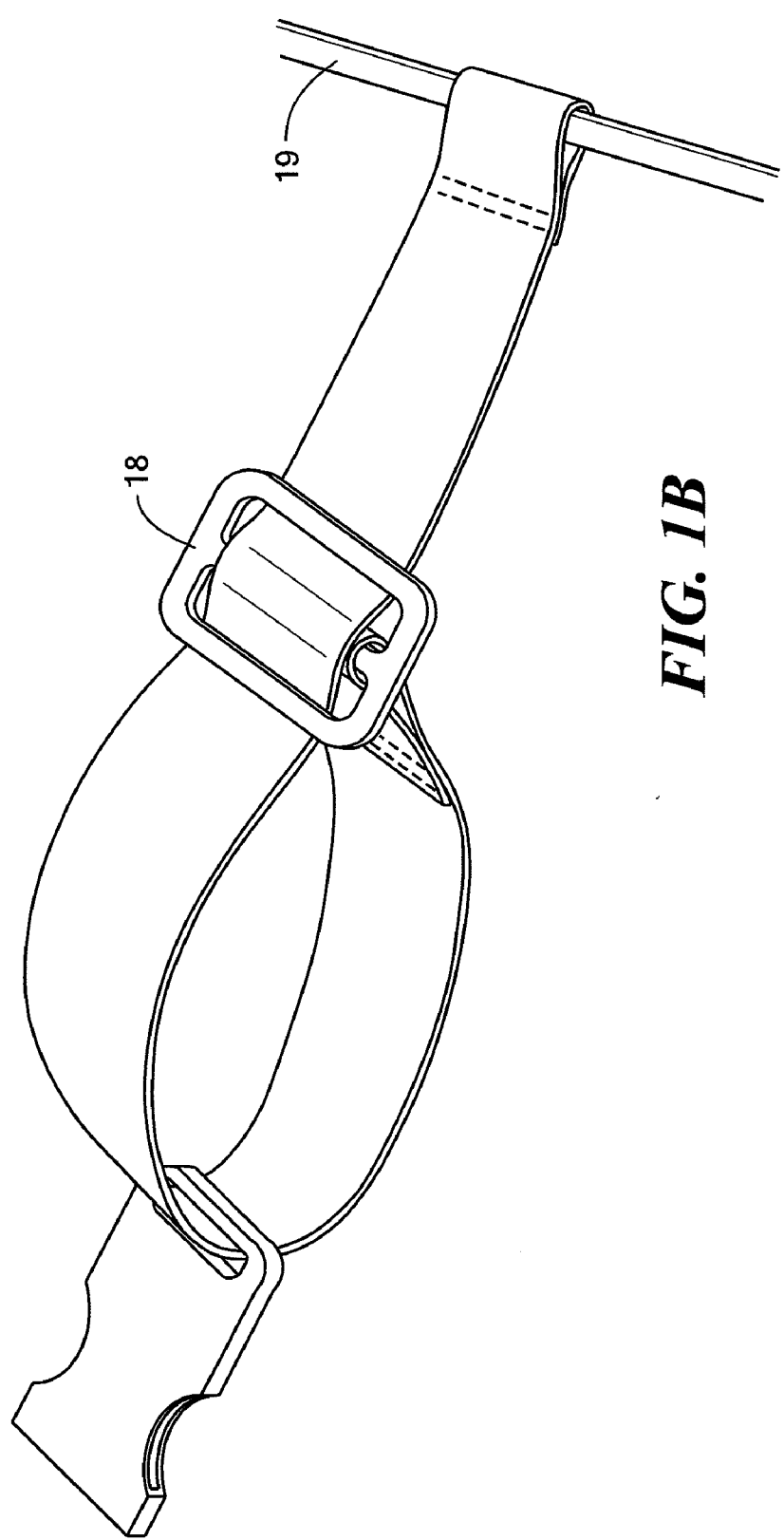
Figure 1C:
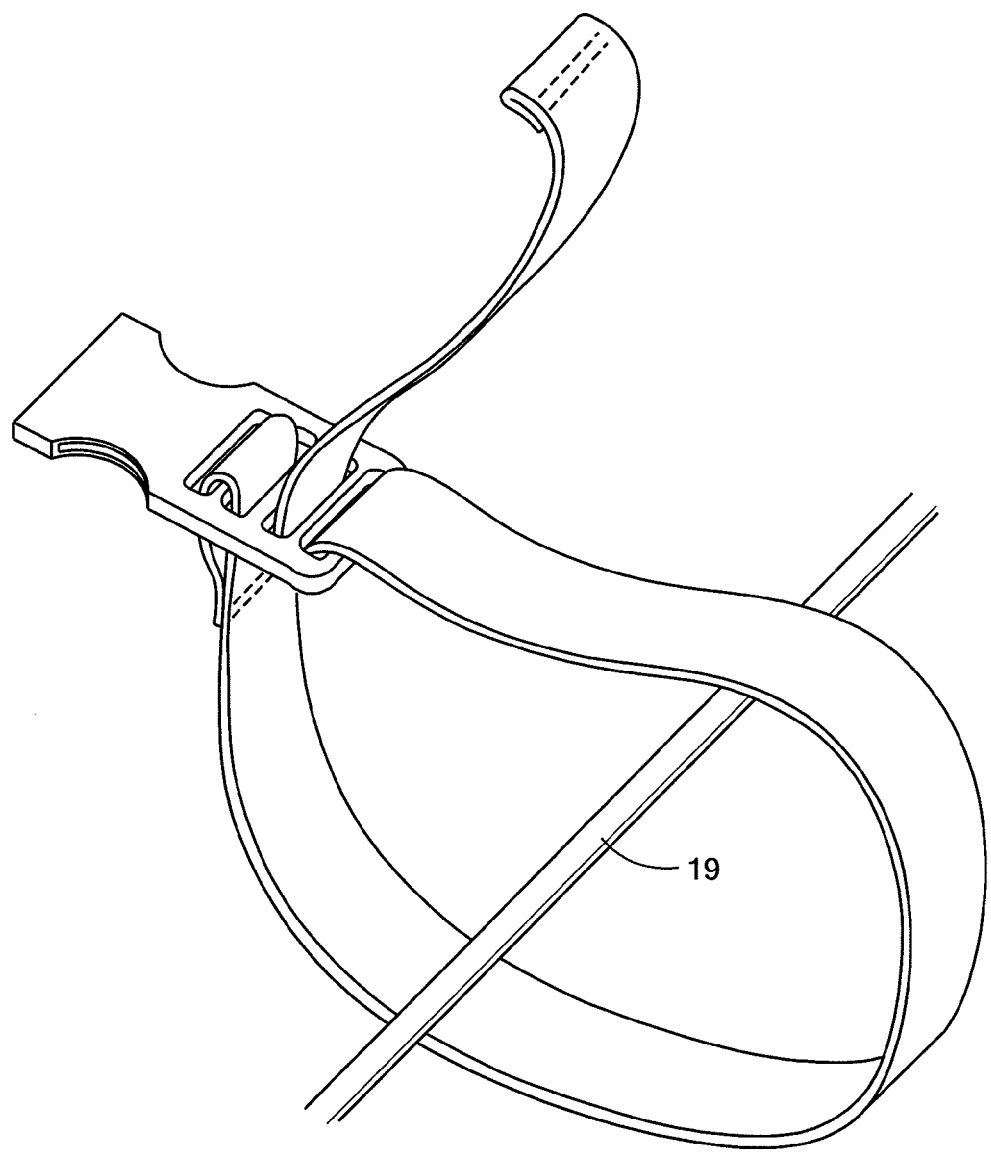
Figure 1D:
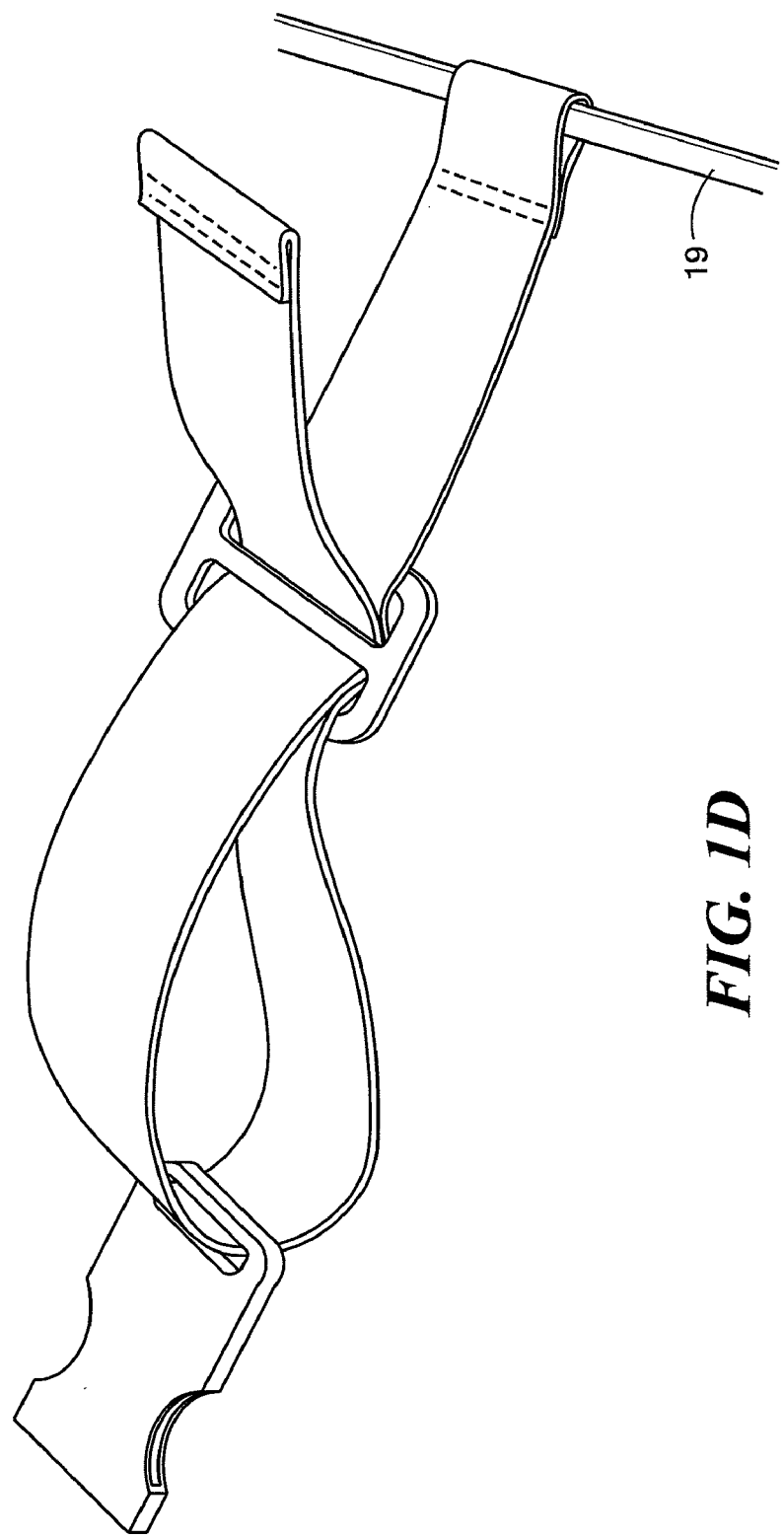
Figure 2:
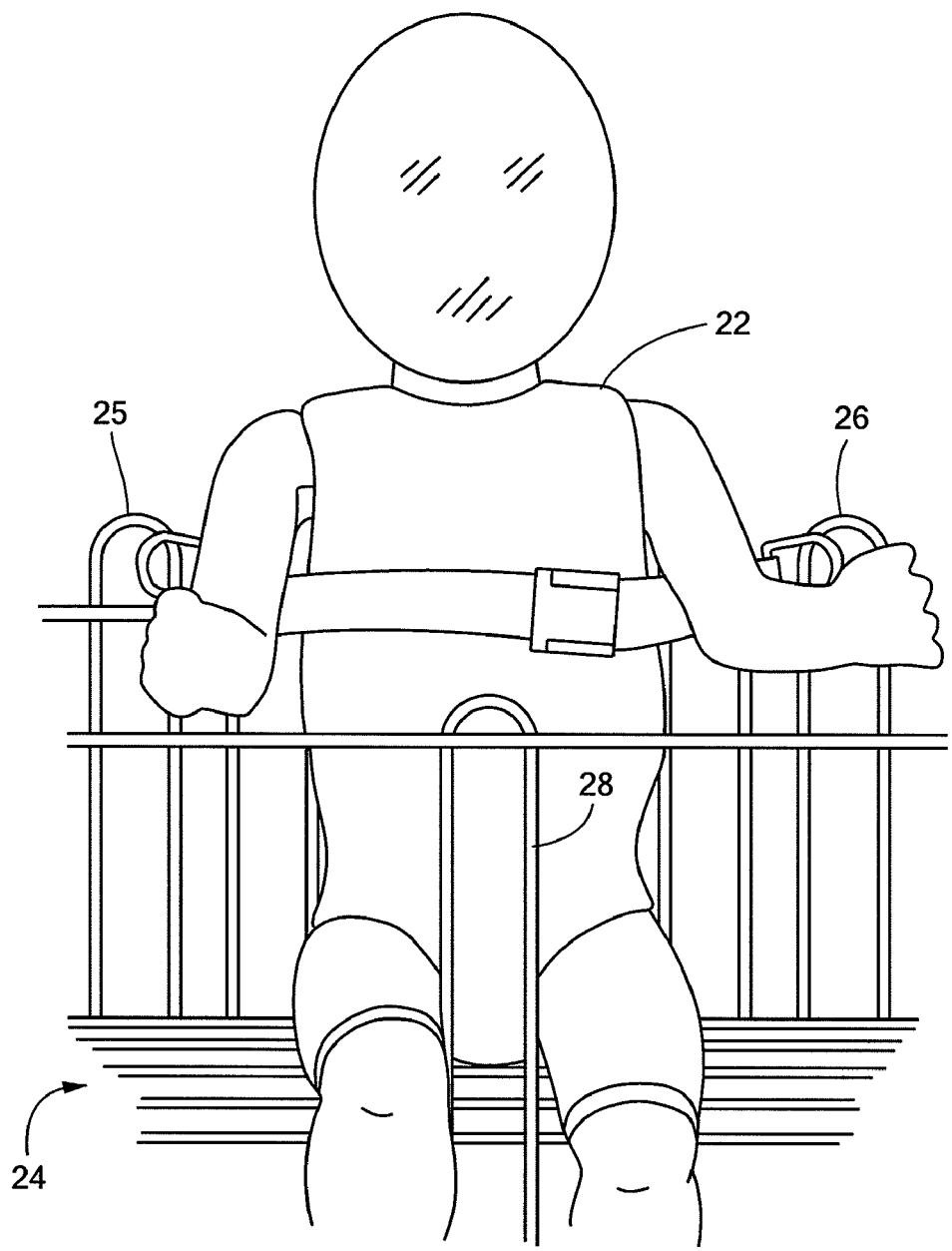
FIG. 2 is a front view of a test dummy in a child shopping cart seat.
Figure 3:
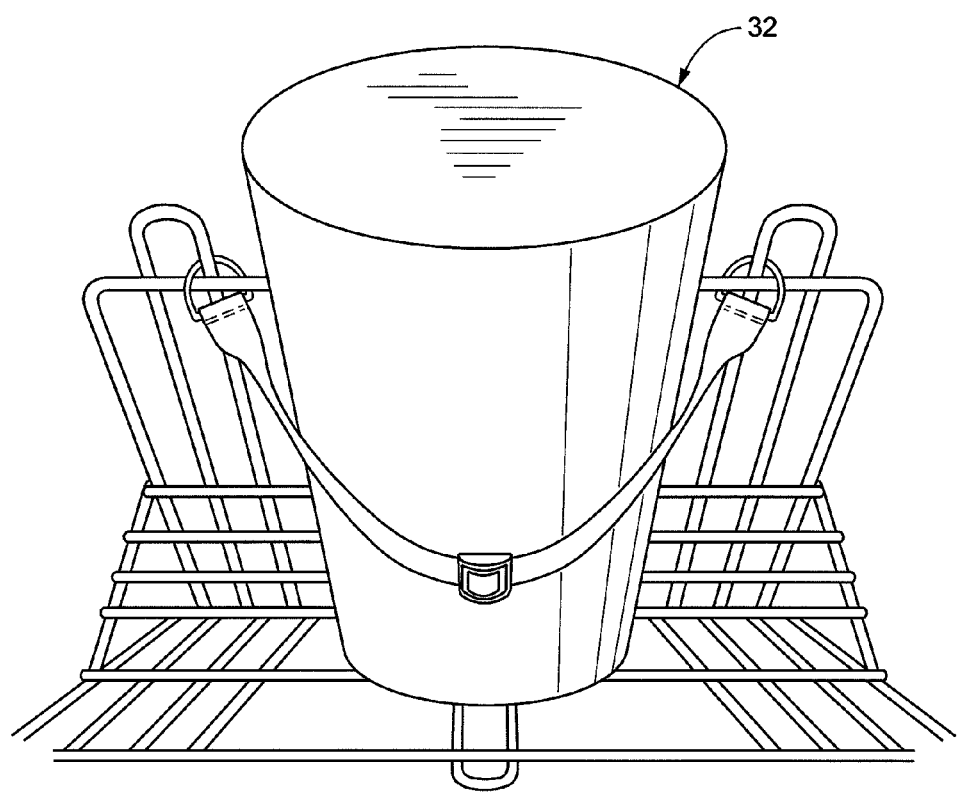
FIG. 3 is a perspective view of a test cylinder located in a child shopping cart seat.
Figure 4:
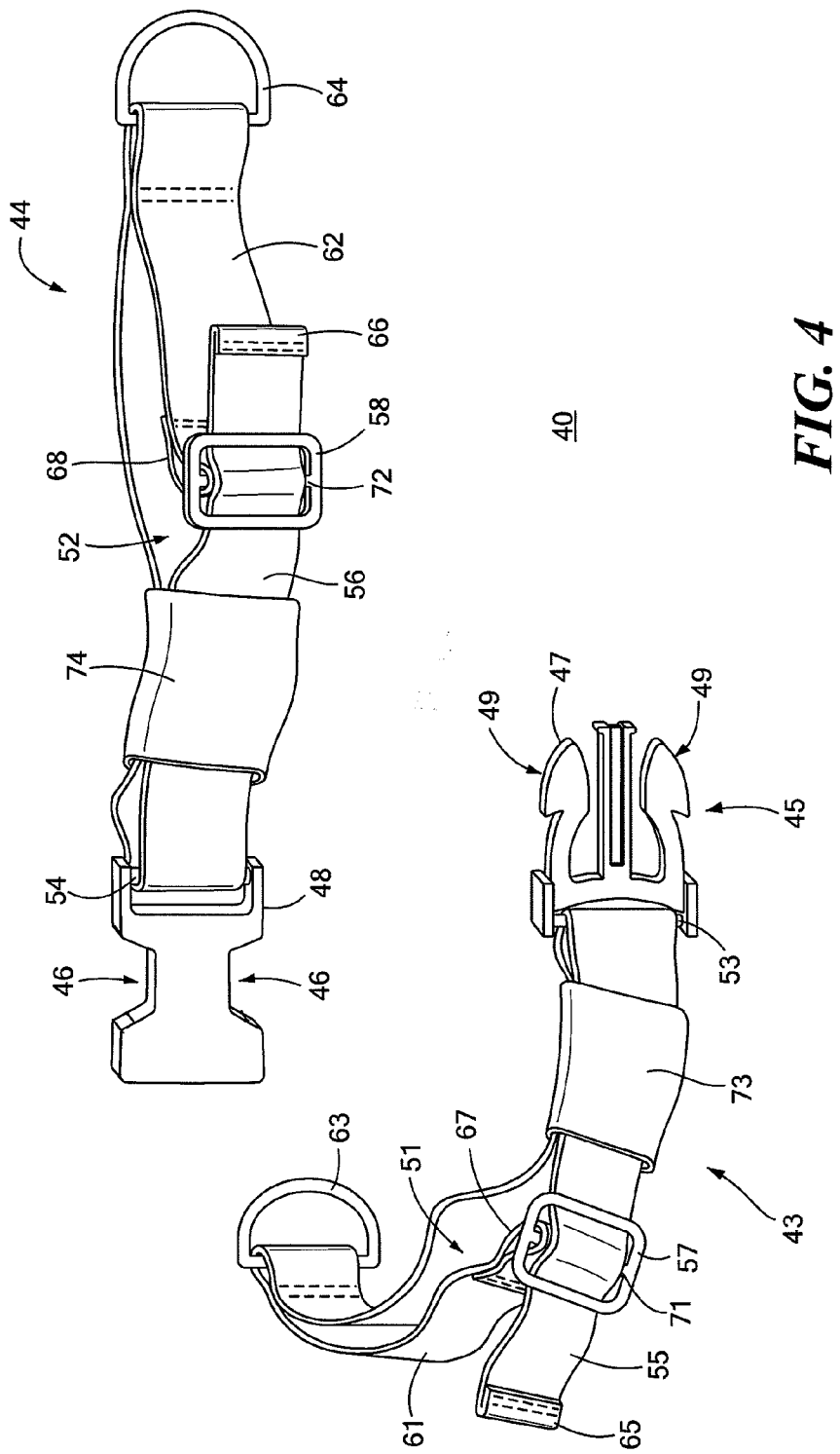
FIG. 4 is a perspective view of a seat belt according to the present invention.

Referring now to FIG. 4, a seat belt according to the present invention is illustrated generally as seat belt 40. Seat belt 40 includes two seat belt components 43, 44 that represent the separate sections of the seat belt that are joined together or disengaged to secure or release a child in a child seat. A buckle 45 is provided as a clasp to permit seat belt portions 43 and 44 to be secured together or released. Buckle 45 consists of a plug 47 and a socket 48. Buckle 45 is a compression fit buckle that is intuitive and simple to operate by inserting or removing plug 47 into or from socket 48. It should be apparent that any type of buckle mechanism or clasp may be used to join belt portions 43, 44.

In buckle 45, tangs 49 on plug 47 are resiliently pressed together upon insertion of plug 47 into socket 48, and are resiliently urged to an engaging position when plug 47 is fully inserted into socket 48. Upon full insertion, tangs 49 can be decompressed to some extent and are positioned into recesses 46 in socket 48 to secure buckle 45 in a clasped condition. Buckle 45 is released by compression of tangs 49 to be free of shoulders formed in recesses 46, to permit the removal of plug 47 from socket 48.

Each of seat belt components 43, 44 have a strap configuration that forms loops 51, 52 respectively. In the embodiment of seat belt 40, plug 47 and socket 48 include strap holders 53, 54, respectively, that are located within loops 51 and 52. Accordingly, plug 47 and socket 48 are free to slide or move along the strap portions 55, 56 that make up loops 51 and 52.

Figure 6:
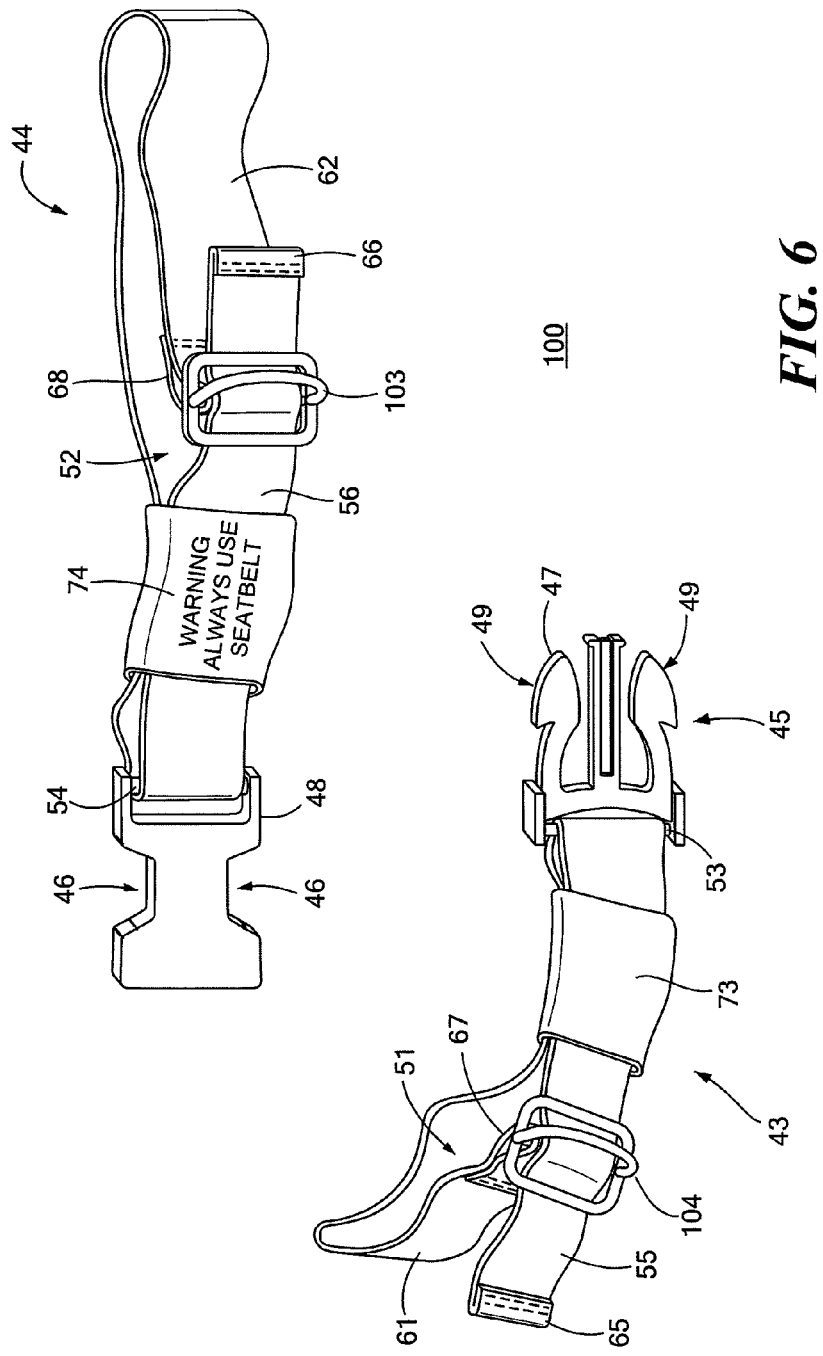
FIG. 6 is a perspective view of another embodiment of the seat belt of the present invention.

Loops 51 and 52 also include adjustment cleats 57, 58, respectively, which secure both the portions of straps 55, 56 and ends of fixed strap portions 61, 62. Ends of fixed strap portions 61, 62 are formed in a small loop around a central bar 71, 72 of adjustment cleats 57, 58 to close loops 51, 52 in each of seatbelt portions 43, 44. Straps 55 and 56 are secured to attachment devices 63, 64 by, for example, stitching for other affixing means. In addition, fixed strap portions 61 and 62 are affixed to attachment devices 63, 64. Affixing strap 55, 56 and fixed straps 61, 62 to attachment devices 63, 64 serves several purposes, including closing loops 51, 52 and securing attachment devices 63, 64 to loops 51, 52 at a specific location. While attachment devices 63, 64 are illustrated as being affixed to adjustment cleats 57, 58 with fixed strap portions 61, 62, it should be apparent that any type of fixture may be used. For example, one or more of adjustment cleats 57, 58 may be formed as a part of attachment devices 63, 64, either rigidly or in a relative relationship, such as a rotational coupling. One or more of adjustment cleats 57, 58 may be secured to the seat rather than attachment devices 63, 64 as well. Attachment devices 63, 64 may also be affixed to the seat in a rigid or relative coupling, to permit straps 55, 56 to be more easily tightened by being drawn through adjustment cleats 57, 58. A configuration of a seatbelt 100 is illustrated in FIG. 6, in which like numerals designate like items in FIG. 4, where attachment devices 103, 104 are shown formed as part of adjustment cleats 57, 58, as discussed above.

Although attachment devices 63, 64 may be arranged to be freely sliding within loops 51, 52, it is preferred to fix attachment devices 63, 64 in a certain location with respect to the operation of seatbelt 40. For example, attachment devices 63, 64 may be affixed to straps 55, 56 with sewing, rivets and the like to maintain little or no relative movement between attachment devices 63, 64 and straps 55, 56. Attachment devices 63, 64 may also be provided as open clasp elements, so that they can be closed around a seat structure to retain seatbelt portions 43, 44 in place.

Straps 55, 56 include end tabs 65, 66 that may include stitching or other securing means to prevent fraying or wear on the ends of straps 55, 56. Tabs 65, 66 also assist in preventing straps 55, 56 from slipping out of adjustment cleats 57, 58. In addition, tabs 65, 66 can assist as a hand hold for a user adjusting seatbelt portions 43, 44.

The arrangement of adjustment cleats 57, 58 with fixed loop portions 67, 68 on central rungs 71, 72, and straps 55, 56 threaded over rungs 71, 72 provides an easily adjustable and relatively stationary construction for permitting adjustment in seatbelt 40. When seatbelt portions 43, 44 are placed under tension, straps 55, 56 tend to be maintained in position through friction forces between adjustment cleats 57, 58 and loop portions 67, 68, which tend to press against straps 55, 56 under tension to maintain the position of the adjustment of seatbelt 40. Seat belt portions 43, 44 need not be placed under tension to obtain satisfactory operation of the configuration of the straps with adjustment cleats 57, 58. Typically, the configuration of straps with cleats 57, 58 permits a simple adjustment of seat belt length by a user, while maintaining a position that is not easily modified by a child.

The straps that make up seatbelt portions 43, 44 can be formed from a single section of material, as illustrated in FIG. 4. One end of the strap material is attached to adjustment cleats 57, 58, while the other end of the strap material is terminated with end pieces 65, 66. The configuration of the strap as one piece of strap material leads to an efficient use of material, while permitting a wide range of adjustability for seatbelt portions 43, 44. For example, straps 55, 56 may be positioned through adjustment cleats 57, 58 to an extreme, where a majority of straps 55, 56 is pulled through adjustment cleats 57, 58. In such an instance, plug 47 or socket 48 are brought into a close position with attachment devices 63, 64. Alternately, straps 55, 56 can be positioned through cleats 57, 58 to a length dependent upon the length of the strap material used to form seatbelt portions 43, 44. In such a position, end tabs 65, 66 can abut cleats 57, 58, so that the length of seatbelt portions 43, 44 is approximately half the length of the entire strap material used to form the seatbelt portions.

It should be apparent that although described above in conjunction with each other, seatbelt portions 43, 44 are not both required to be configured according to the present invention. A number of other configurations of retainers, strap arrangements and clasp mechanisms may be used to form a seatbelt in accordance with the present invention. For example, a conventional seatbelt arrangement may be used for one portion of the seatbelt, while the other portion of the seatbelt is configured according to the present invention. plug 47 or socket 48 may be directly, secured to a seat structure, while the counterpart seatbelt formed according to the present invention is provided with enough strap material to permit a wide range of adjustability in accordance with the present invention. The two adjustment configuration of seatbelt 40 provides the user with a great deal of flexibility, while maintaining an intuitive operation and ease of use. For example, when a seatbelt is configured according to the embodiment illustrated as seatbelt 40, a user can adjust strap 55, or strap 56 or both to obtain a desired fit.

By providing a number of adjustments with a seatbelt that is used in a public environment, greater user flexibility can be achieved. For example, a number of users may be left handed and prefer to make adjustments on a seatbelt portion presented to their left side when positioned to face the child seat. Similarly, right handed users may prefer to make adjustments on the right hand seatbelt portion that they may find more easily accessed when facing the child seat. Because the two adjustment configuration offers left and right side adjustments, it accommodates both right and left handed users without compromising security, adjustability or ease of use.

Another advantage of having two adjustments is the reduction of the length of strap extending from the adjustment cleat. This advantage is particularly useful when the seatbelt is placed around children in the smaller end of a size range. By providing a two-adjustment seatbelt, adjustments can be shared between the seatbelt parts, and excessive strap material extending from the adjustment cleat for a single adjustment seatbelt is avoided.

Seatbelt 40 illustrated in FIG. 4 shows the use of sleeves 73, 74 that encircle the strap material used for seatbelt portions 43, 44. Sleeves 73, 74 are generally free to slide along seatbelt portions 43, 44, and have a dimension that tends to prevent their sliding over plug 47 or socket 48, in either a clasped or unclasped state. Sleeves 73, 74 are configured to be difficult to slide beyond bars 53, 55 of plug 47 and socket 48, for example. Sleeves 73, 74 are configured in this exemplary embodiment to permit them to be easily slid over adjustment cleats 57, 58 so that they can be positioned along substantially an entire length of seatbelt portions 43, 44. In addition, or alternately, sleeves 73, 74 can be configured to not slide past or cover cleats 57, 58.

Because seatbelt portions 43, 44 are formed in the shape of loops 51, 52, the possibility of a strangulation hazard may be present for children in the smaller end of the size range. Accordingly, seatbelt 40 should avoid strap loops of a particular dimension so that children will not be able to place any strap loops over their heads. For example, if a six-month-old child in the 5th percentile for size has a head diameter of approximately 40 centimeters, the loops in the seatbelt according to the present invention should be configured to be less than this amount to avoid any potential strangulation risks. The provision of sleeves 73, 74 on seatbelt portions 43, 44 prevents the formation of a loop in the strap that is greater than a particular dimension. The dimensions of sleeves 73, 74 can be adjusted depending upon the length of the strap material used to construct seatbelt portions 43, 44, so that a strap loop greater than a specified dimension is avoided. For example, a length of sleeves 73, 74 can be increased if the length of the strap material used to form seatbelt portions 43, 44 is lengthened, so that any resulting loops 51, 52 are below a particular dimension. In the case of embodiments where a single adjustment is provided on one of seatbelt portions 43, 44, for example, a number of sleeves may be used if the length of the seatbelt portion used to maintain an appropriate range of adjustment becomes too long to be adequately compensated by a single sleeve. Sleeves 73, 74 can also be formed of a springy or resilient material so that they can be potentially compressed if a seatbelt portion is adjusted to the lower limits of its adjustment range. Accordingly, even if multiple sleeves are used in a single seatbelt portion, a full range of adjustability is still available since the sleeves can be compressed together, and restored to a nominal dimension when the seatbelt portion is adjusted to be longer.

It should be apparent that sleeves 73, 74 may be constructed to have a dimension approximating that of the longest range of length for the seatbelt portion. For example, a sleeve may have a dimension that approximates half the length of the strap material to substantially cover the entire strap adjustment range for a seatbelt portion. In such an embodiment, openings may be provided in the sleeve to permit access to adjustment cleats 57, 58 and straps 55, 56 to allow the user to adjust the seatbelt length. Coverage of the seatbelt by the sleeve may thus take on any number of forms, provided that at least one of the seatbelt portions remains adjustable and any loops that are formed in the adjustable seatbelt portion have a size below that of a specified dimension with the presence of the sleeve.

Sleeves 73, 74 may also be provided with indicia to communicate information to the user, such as instructions, warnings, identifiers or promotional messages. According to one embodiment, the sleeves or the indicia may be replaceable so that different information can be displayed on the sleeves when in use with the seatbelt on a child seat.

Figure 5:
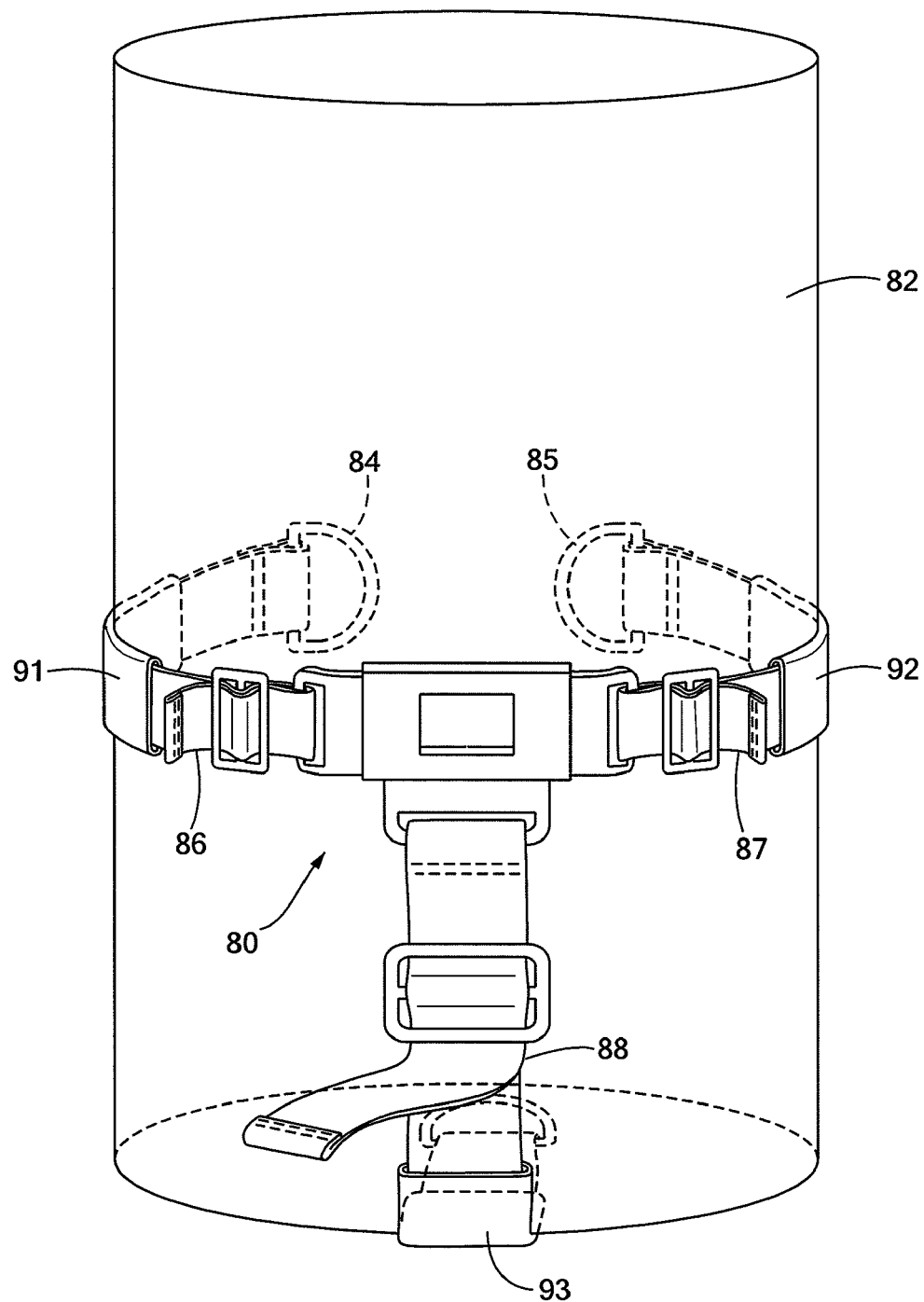
FIG. 5 is a perspective view of another embodiment of the seat belt of the present invention.

Referring now to FIG. 5, a child seatbelt test configuration is illustrated. A seatbelt 80 is provided with two seatbelt portions and a crotch strap, each of which extend around a test cylinder 82. Test cylinder 82 represents a dimensional standard for use in measuring compliance of children's safety belts with current or proposed regulations. In the configuration illustrated by seatbelt 80, the two seatbelt portions wrap around test cylinder 82 and are attached to a portion of the child seat with attachment devices 84, 85. Attachment devices 84, 85 are located closer to each other than a diameter of cylinder 82 to provide a more snug fit for seatbelt 80. In this configuration, seatbelt 80 provides a wide range of adjustability to provide a snug fit for test cylinder 82, or a child occupant of the child seat. The dimensions of test cylinder 82 can be set in relation to measurements taken on a 6th month old child in the 5th percentile and 15 month old child in the 95th percentile. Seatbelt 80 should be able to accommodate children in this range with a snug fit, and with less than an inch of space between seatbelt 80 and the test cylinder to ensure that a child secured by seatbelt 80 is safely secured with a custom fit in accordance with the recommended standard.

One or more seatbelt portions 86-88 may be formed according to the present invention to be adjustable with loose ends for the strap. Seat belt portions 86-88 may also include sleeves 91-93 that encircle the straps of seatbelt portions 86-88 to limit the dimension of loops formed by the straps in seatbelt portions 86-88. The provision of a seatbelt according to the present invention for any of seatbelt portions 86-88 permits a wide degree of adjustment to obtain a snug fit. The seatbelt also permits compliance with certain child restraint protocols, while accommodating a wide range of sizes of children. The provision of sleeves 91-93 in conjunction with the seatbelt according to the present invention improves the safety of seatbelt 80 and provides the opportunity to display information or indicia as desired.

The seatbelt according to the present invention may be used in any type of child seat to restrain a child. Some non-limiting examples of child seats that would benefit from the present invention are strollers, high chairs and shopping cart seats. Depending upon the application, the seatbelt may be configured to have a double adjustment across a waist point for the occupant, or a single adjustment. The seatbelt or harness can have a single point of attachment, or multiple attachment points, depending upon the arrangement of the seatbelt strap and the attachment devices. For example, the seatbelt portions may be attached to a single attachment device, which is then coupled to the child seat. Alternately, a buckle or clasp component may be directly coupled to the seat, while an accompanying strap with the mating buckle or clasp may be made adjustable. In such an instance, the attachment device for retaining the adjustable seatbelt portion can be coupled to the buckle or clasp that is secured directly to the seat. Alternately, multiple attachment points may used when parts of the seatbelt or buckle are attached directly to the seat.

The present invention is not limited to seatbelts, but can also be used for items like shoulder straps or other adjustable restraints, such as, for example, in a five-point harness. In addition, the present invention is not limited to restraints for child seats, but may also be used in any type of application where a buckled strap with a wide range of adjustability and child safety features is desirable. For example, if the present invention is used on luggage or backpacks for children, smaller children that may have access to the luggage or backpacks are prevented from strangulation hazards. At the same time, the luggage or backpacks can be custom fit to a number of different children, or can be adjusted as the child grows to maintain a custom fit.

The seatbelt according to the present invention may also be provided with devices that help to secure the loose ends of the straps, such as through a clip or other retainer. In typical applications, however, where a number of different users may operate the seatbelt, it is preferable to permit he seatbelt to be adjusted as easily as possible, so that no retainers for the loose strap end are used.

It will be appreciated by those of ordinary skill in the art that modifications to and variations of the above-described methods and system may be made without departing from the inventive concepts disclosed herein. Accordingly, the invention should not be viewed as limited except as by the scope and of the appended claims.

What is claimed is:

1. A seatbelt for a child seat, comprising:
   a clasp for coupling and decoupling the seatbelt;
   a retainer secured to the seatbelt and operable to secure the seatbelt to the child seat;
   an adjustment device affixedly secured to the retainer with a strap and operable to adjust seatbelt length; and
   a belt secured to the retainer and slidably coupled to a portion of the clasp and being slidably threaded through the adjustment device.

2. The seatbelt according to claim 1, further comprising a sleeve at least partially enclosing two facing sections of the belt with an interior dimension sufficient to permit the two facing belt sections to slide past each other.

3. The seatbelt according to claim 2, further comprising indicia on the sleeve.

4. The seatbelt according to claim 1, wherein the adjustment device is integral with the retainer.

5. The seatbelt according to claim 1, further comprising the clasp being secured to the child seat.

6. The seatbelt according to claim 1, further comprising:
   another retainer secured to the seatbelt; and
   the retainers are mounted to the child seat and spaced a distance apart that is less than a smallest adjustable length of the seatbelt.

7. A method for constructing a seatbelt for a child seat, comprising:
   threading a belt through a seatbelt clasp;
   threading a first end of the belt through an adjustment device for adjusting a length of the seatbelt;
   affixedly securing a second end of the belt to the adjustment device; and
   affixedly securing the adjustment device to the child seat with a strap.

8. The method according to claim 7, further comprising providing a sleeve covering at least a portion of two belt sections facing each other.

9. The method according to claim 7, further comprising securing the strap to the child seat with a retainer.

10. The method according to claim 9, further comprising forming the retainer as part of the adjustment device.

11. A seatbelt for a child seat, comprising:
    a belt having a first end and a second end;
    a retainer secured to the seatbelt for securing the seatbelt to the child seat;
    an adjustment device slidably coupled to the belt for contributing to adjusting seatbelt length and being affixedly secured to the belt at the first end;
    the adjustment device being affixedly secured to the retainer to maintain the adjustment device relatively close to the retainer in relation to a length of the belt; and
    a sleeve at least partially enclosing two facing sections of the belt with an interior dimension sufficient to permit the two facing belt sections to slide past each other, the adjustment device being between the sleeve and the retainer.

12. A seatbelt for a child seat, comprising:
    a clasp for coupling and decoupling the seatbelt;
    an adjustment device for adjusting a length of the seatbelt and having a pair of outer bars and a central bar connected together to form openings on either side of the central bar;
    a belt having a first end and a second end and slidably threaded through a portion of the clasp, the first end of the belt being threaded through the openings around the central bar and secured to the belt to form a relatively small loop around the central bar, the second end of the belt being slidably threaded through the openings around the central bar and projecting freely from the adjustment device such that a length of the seatbelt can be adjusted by sliding the belt through the adjustment device; and
    a retainer for retaining the seatbelt to the child seat and being secured to the seatbelt on one or more of the adjustment device or a belt portion formed as an adjustable loop with the adjustment device.

13. The seatbelt according to claim 12, further comprising the retainer being secured to the adjustment device with a strap.

14. The seatbelt according to claim 12, further comprising the retainer being formed as a part of the adjustment device to secure the retainer to the adjustment device.

15. The seatbelt according to claim 12, further comprising the retainer having a closed through opening, the belt portion passing through the closed through opening to secure the retainer to the belt portion.

16. The seatbelt according to claim 12, further comprising a sleeve at least partially enclosing two facing sections of the belt portion with an interior dimension sufficient to permit the two facing belt sections to slide past each other.

* * * * *